Patented Sept. 8, 1953

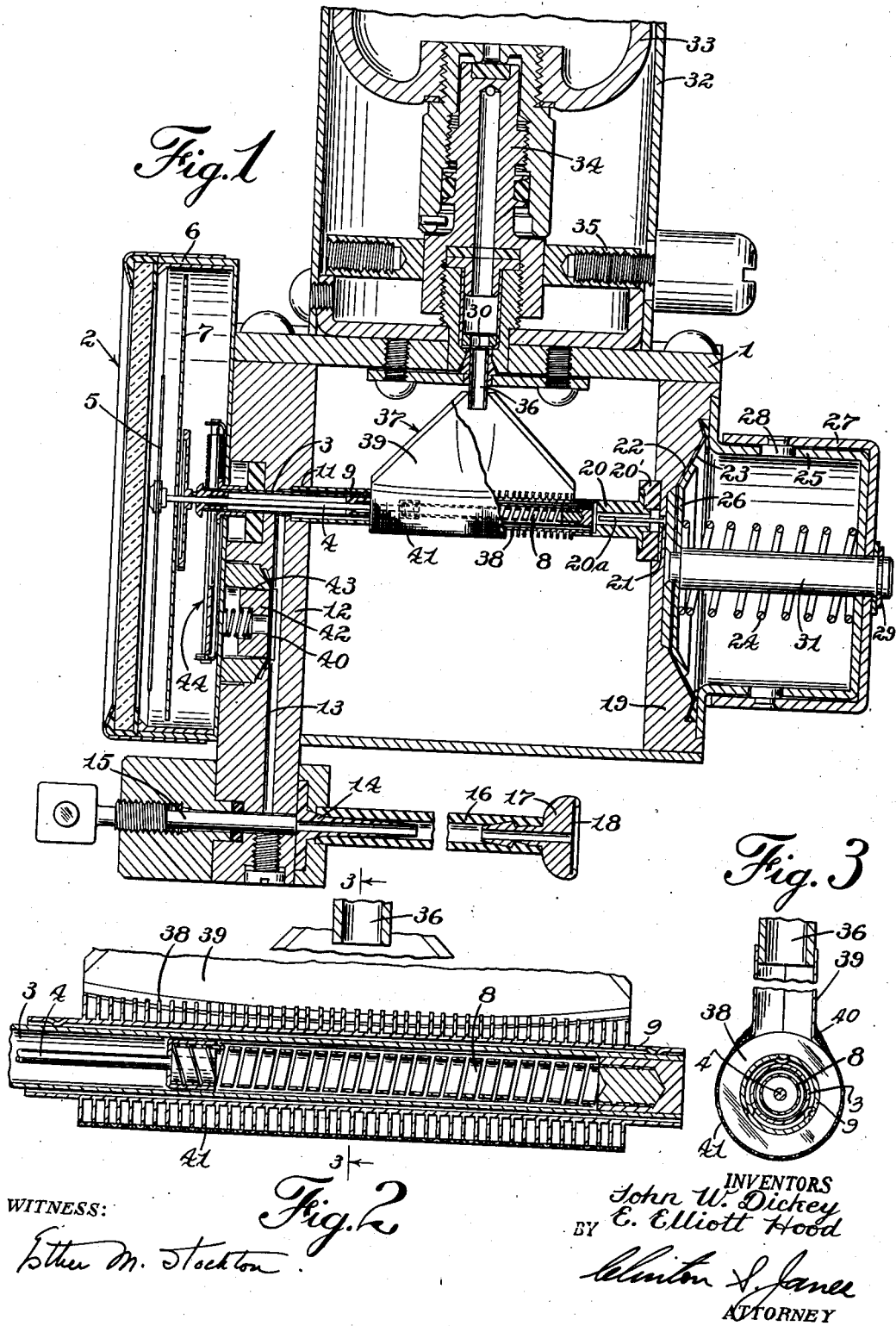
Sept. 8, 1953     J. W. DICKEY ET AL     2,651,194
FREEZEMETER
Filed Jan. 21, 1952     2 Sheets-Sheet 1
INVENTORS
John W. Dickey
E. Elliott Hood
BY
Clinton L. Janes
ATTORNEY
WITNESS:
Esther M. Stockton

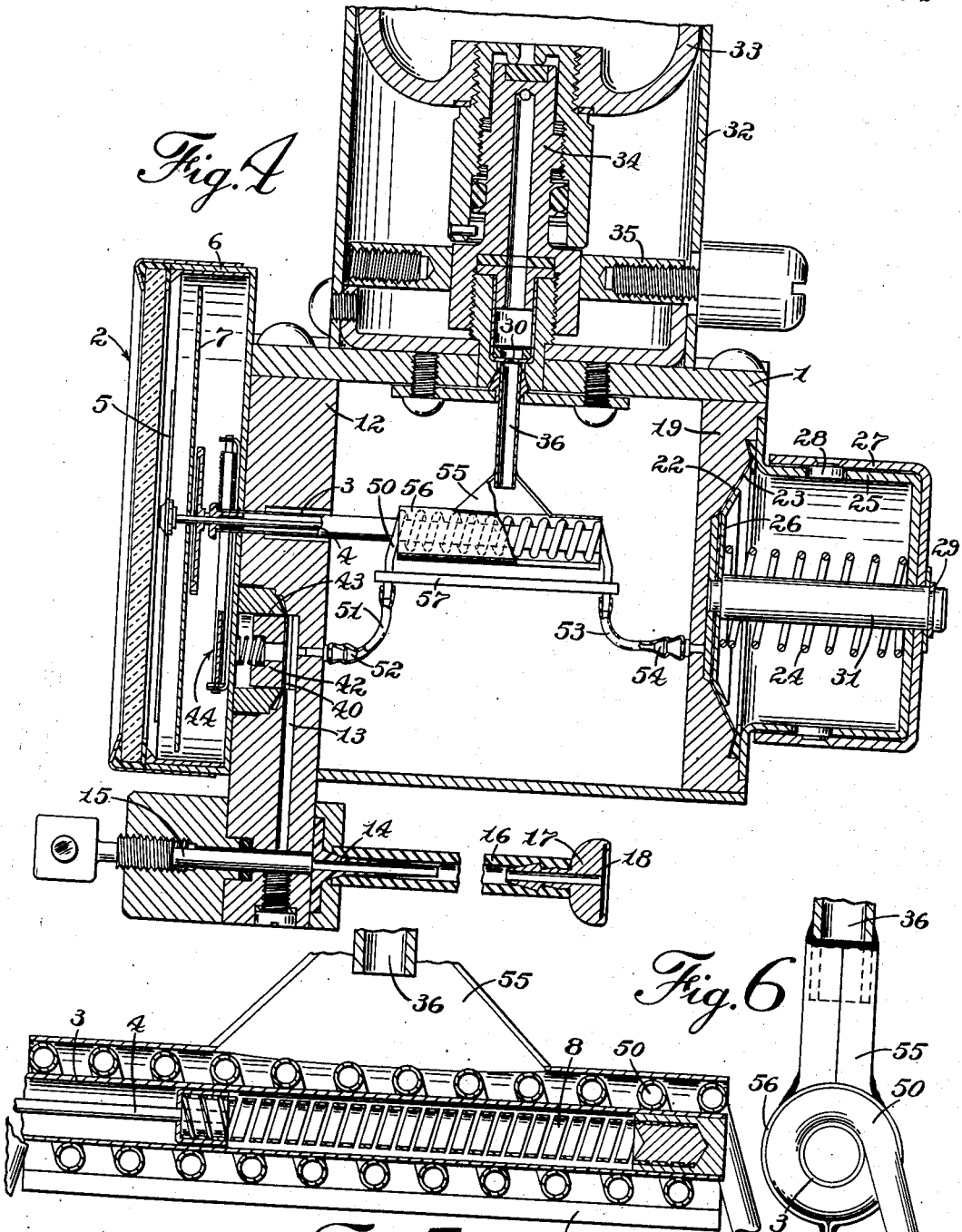

2,651,194

UNITED STATES PATENT OFFICE 2,651,194

FREEZEMETER

John W. Dickey, Newfield, and E. Elliott Hood, Elmira, N. Y., assignors to Bendix Aviation Corporation, a corporation of Delaware Application January 21, 1952, Serial No. 267,452

4 Claims. (Cl. 73—17)

1

The present invention relates to a freezemeter and more particularly to a device for determining the thawing point of a liquid.

The present disclosure is in the nature of an improvement of the structure shown in the application of Dickey, Serial No. 83,986, filed March 28, 1949, and assigned to the assignee of the present application.

The Dickey application discloses an instrument for freezing a small sample of liquid to be tested, then allowing it to thaw and recording the temperature at which it begins to flow under a constant pressure. Experience with the instrument disclosed in said Dickey application has proved that with water mixtures of the so-called "permanent antifreeze" type having an ethylene glycol base, the freezing point and the thawing point are either indistinguishable or bear a constant relation to each other such that either one makes a satisfactory basis for classifying liquid coolants.

It is an object of the present invention to provide a novel freezemeter of the above type incorporating novel structure for withdrawing heat from the sample to be frozen.

It is another object to provide such a device in which the heat exchanger is arranged to use the cooling effect produced by the release of liquified carbon dioxide.

It is another object to provide such a device in which the expansion of the released carbon dioxide is controlled in a progresive manner from the point where it enters the heat exchanger so as to reduce the tendency to clog the heat exchanger with localized deposits of snow.

It is another object to provide such a device in which the cooling effect of the expanded carbon dioxide gas is spread out substantially uniformly over the body of the heat exchanger containing the sample to be frozen.

Further objects and advantages will be apparent from the following description taken in connection with the accompanying drawing in which:

Fig. 1 is a vertical substantially mid-sectional view of a preferred embodiment of the invention showing the parts in normal or idle position.

Fig. 2 is an enlarged sectional detail of the heat exchanger.

Fig. 3 is a section taken substantially on the line 3—3 of Fig. 2.

Fig. 4 is a view similar to Fig. 1 showing a modified form of heat exchanger.

Fig. 5 is an enlarged sectional detail of the heat exchanger shown in Fig. 4, and Fig. 6 is an end view of the heat exchanger as shown in Fig. 5.

2

In Fig. 1 of the drawing there is illustrated a metallic frame or housing 1 in which is mounted a mechanical type of thermometer generally indicated by the numeral 2. The thermometer comprises a stem 3 in which a staff 4 is rotatably mounted. A needle 5 is fixed on the end of the staff 4 within the casing 6 of the thermometer so as to rotate in front of a fixed scale 7. The other end of the staff is connected to the stem 3 of the thermometer through a spiral ribbon of bimetal 8 which forms the heat-sensitive element of the thermometer.

The stem 3 of the thermometer is surrounded in spaced relation by a tube 9, one end of which is sealed in any suitable manner in an opening 11 in the frame member 12. Opening 11 connects with a passage 13 leading from a nozzle 14, the connection being under the control of a manually operable valve 15. A flexible hose 16 is connected at one end to the nozzle 14, and carries at its other end an inlet fitting 17 provided with a strainer 18.

The other end of the tube 9 is mounted in a sleeve 20 of insulating material such as nylon, which sleeve is seated in a ring 20' of hard rubber or the like fixedly mounted in a frame member 19 having a passage 21 leading to a chamber 22 which is closed by a flexible diaphragm 23. A spring 24 in a pump chamber 25 normally flexes the diaphragm 23 in the direction to eject the contents of chamber 22, by means of a piston member 26 acting on the diaphragm. Means for compressing the spring 24 to retract the diaphragm is provided in the form of a manually rotatable cup member 27 having an inclined pin and slot connection 28 with the pump chamber 25, and connected as shown at 29 with a plunger 31 fixed to the piston 26.

A cylindrical support 32 is fixedly mounted on the frame 1 and is arranged to receive the lower end of a storage cylinder or flask 33 containing liquified carbon dioxide under pressure. Valve mechanism for the carbon dioxide cylinder, indicated generally by the numeral 34, is releasably connected to the cylindrical support 32 as shown at 35, so that rotation of the carbon dioxide flask by the operator ocntrols the admission of gas from the flask through a small fixed aperture 30 into a nipple 36 forming part of a heat exchanger unit 37.

The heat exchanger, as best shown in Fig. 2, comprises a portion of the tube 9 which is provided with a plurality of radial fins 38, and a funnel shaped duct member 39 which is attached to the gas discharge nipple 36 and conducts the mixture of gas and snow escaping from the aperture 30 over the fins 38 and around the tube 9. The funnel member 39 terminates in a sleeve 41 of metallic screening material which surrounds the tube 9 and fins 38 and is open at its ends as shown in Fig. 2. Sleeve 41 is slotted on its upper side for connection with the mouth of the funnel-shaped duct 39 as best shown at 40 in Fig. 3, the arrangement being such that the freezing gas and snow mixture is distributed substantially uniformly along the finned portion of the tube 9 and brought into intimate contact with the surfaces of the tube and fins, without building up any substantial back pressure.

The heat exchanger is so dimensioned that the heat-sensitive element 8 of the thermometer lies wholly within the heat exchanger so as to be uniformly cooled thereby during the freezing process.

Means are provided for automatically arresting the thermometer needle at the thawing point of the sample. As here shown, this means comprises a magnet 42 which is slidably mounted in a cylindrical passage 43 in the frame member 12, in contact with a flexible diaphragm 40 in such a position that fluid pressure in the passage 13 causes the magnet to be moved into contact with the thermometer casing 6 whereby it becomes effective to operate an arresting device indicated generally by numeral 44. Since the arresting structure is not part of the present invention, further description thereof is believed unnecessary.

In the operation of the device to determine the thawing point of an unknown liquid such as the coolant for an internal combustion engine, the inlet fitting 17 is introduced into the engine radiator, the valve 15 is opened, and the rotatable pump member 27 is rotated to retract the diaphragm 23 and thereby draw a sample of the liquid up through the tube 9 into the chamber 22. The valve 15 is then closed, and the carbon dioxide flask 33 rotated to open the valve 34 and admit refrigerating gas through the aperture 30 into the heat exchanger 37. The intense cold so produced around the finned tube 9 quickly extracts the heat from the portion of the liquid surrounding the thermometer stem 3 within the tube 9 causing it to congeal. After the sample is frozen, the flask valve 34 is closed, and the pump member 27 is released so as to allow the spring 24 to press against the diaphragm 23 and thus apply pressure tending to eject the liquid from the chamber 22.

The frozen sample is then allowed to thaw by conduction of heat from the surrounding atmosphere and connected parts and when this occurs, the pressure in pump chamber 22 is transmitted to the passage 13. Since this passage is closed by the valve 15, the pressure therein is effective to move the magnet 42, causing the thermometer needle to be arrested at the thawing point of the sample.

It has been found in the operation of this device that it sometimes happens that the freezing operation is continued until the liquid in the outer ends of tube 9, and in the sleeve 20 is frozen, and that when this occurs, the sample which surrounds the thermometer stem may thaw first, so that the reading of the instrument becomes unreliable. In order to conduct a small amount of heat from the frame of the instrument through the sleeve 20, a copper wire 20a is arranged to traverse the sleeve, its outer end being flattened and pressed into the passage 21 in frame member 19 so as to make firm contact therewith. At the opposite end of the tube 9, heat is received directly from the frame member 12 through the joint at 11. This arrangement insures that when the frozen material is allowed to thaw, the material surrounding the heat-sensitive element of the thermometer will be the last to thaw and the thermometer will therefore indicate accurately the thawing temperature of the sample at the instant the needle is arrested by the hydraulic pressure transmitted through the thawed sample.

In the embodiment of the invention illustrated at Figures 4 to 6, the elements of the thermometer, sampling system, and source of freezing gas are the same as in the first embodiment described and the parts are similarly numbered. This embodiment however has a modified form of heat exchanger. As here shown, a small thin-walled tube 50 is wound around the thermometer stem 3 in the form of a spiral having spaced convolutions and is connected at one end by a conduit 51 to a nipple 52 communicating with the passage 13 in the frame member 12. At its other end, tube 50 is connected by a conduit 53 to a nipple 54 communicating with the chamber 22 in the frame member 19.

A funnel-shaped member 55 is attached to the gas discharge nipple 36 and terminates in a split sleeve 56 which surrounds the spiral tube 50 and the thermometer stem 3 so as to cause the freezing gas to traverse the space between the convolutions of the spiral tube 50, allowing the gas to emerge at the ends of the sleeve 56.

In order to ensure that any liquid frozen in the tubing outside the body of the heat exchanger thaws before that which surrounds the thermometer stem inside the heat exchanger, it has been found desirable to mount a metallic body of substantial mass and heat capacity in thermal contact with said tubing. For this purpose a bar 57 of suitable material such as brass is connected to the projecting ends of the tube 50 and serves to supply a small amount of heat to accelerate the thawing of any frozen material between the bar and the heat exchanger. This arrangement ensures that when the sample surrounding the heat-sensitive element of the thermometer melts, there is no obstruction which might prevent the immediate arrest of the thermometer needle.

The operation of this embodiment of the invention is the same as the first embodiment, and further description thereof is believed to be unnecessary.

Although but two embodiments of the invention have been shown and described in detail, it will be understood that other embodiments are possible and that changes may be made in the form and arrangement of the parts without departing from the spirit of the invention.

We claim:

1. In an apparatus for determining the thawing point of a liquid, a thermometer having a tubular stem with a temperature-responsive element therein, a freezing tube surrounding the stem and extending beyond the temperature-responsive element therein, means for filling the tube with the liquid to be tested, a source of gas terminating in a nipple spaced at low temperature laterally from said tube at an intermediate point in its length, an open-ended slotted sleeve partially surrounding the tube, and a tapered conduit connected at its throat to the nipple and at its mouth to the slot of the sleeve.

2. An apparatus as set forth in claim 1 in which the sleeve located around the freezing tube is formed of reticulated material which permits the escape of the freezing gas after it has passed over the freezing tube, in a substantially uniform manner throughout the length of said tube.

3. An apparatus as set forth in claim 1 in which the freezing tube is in the form of a spiral with convolutions coiled around the thermometer stem in spaced relation so as to permit the freezing gas to come into direct contact with the thermometer stem.

4. In an apparatus for determining the thawing point of a liquid, a tubular thermometer including a stem containing a heat-responsive element, a freezing tube surrounding the stem, heat-responsive means for introducing into said tube a sample of the liquid to be tested, and means for directing a flow of refrigerant fluid laterally across and around said tube and thermometer stem throughout the extent of the heat-responsive element; and means for conducting a small amount of heat into the ends of the freezing tube after cessation of the freezing operation, to ensure that the material frozen around the heat-sensitive element of the thermometer is the last of the material to thaw.

JOHN W. DICKEY.
E. ELLIOTT HOOD.

References Cited in the file of this patent
UNITED STATES PATENTS

| Number | Name | Date |
| --- | --- | --- |
| 1,443,537 | Hortvet | Jan. 30, 1923 |
| 1,632,748 | Parsons | June 14, 1927 |
| 1,680,636 | Rowan | Aug. 14, 1928 |
| 2,079,344 | Geyer | May 4, 1937 |
| 2,591,084 | Martin | Apr. 1, 1952 |